United States Patent [19]

Kim

[11] Patent Number: 5,493,317
[45] Date of Patent: Feb. 20, 1996

[54] ON-SCREEN DISPLAY DEVICE FOR A MULTIMODE MONITOR AND METHOD THEREOF

[75] Inventor: Yong H. Kim, Seoul, Rep. of Korea

[73] Assignee: Samsung Electronics Co., Ltd., Suweon, Rep. of Korea

[21] Appl. No.: 278,257

[22] Filed: Jul. 21, 1994

Related U.S. Application Data

[63] Continuation of Ser. No. 990,413, Dec. 15, 1992, abandoned.

[30] Foreign Application Priority Data

May 12, 1992 [KR] Rep. of Korea .................. 92-7980

[51] Int. Cl.[6] ............................................. G09G 3/00
[52] U.S. Cl. ........................ 345/213; 348/555; 348/569
[58] Field of Search ............................. 345/115, 177, 345/156, 902, 132, 213, 113, 114, 132; 348/555, 554, 441, 569

[56] References Cited

U.S. PATENT DOCUMENTS

| | | | |
|---|---|---|---|
| 3,255,305 | 7/1966 | Chatten | 348/577 |
| 4,218,698 | 8/1980 | Bart | 348/600 |
| 4,626,892 | 10/1986 | Nortrup | 348/519 |
| 4,745,402 | 5/1988 | Auerbach | 345/158 |
| 4,779,132 | 10/1988 | McBeath | 345/213 |
| 4,962,427 | 10/1990 | Lunn | 348/555 |
| 4,991,023 | 2/1991 | Nicols | 345/213 |
| 4,994,912 | 2/1991 | Lumelsky | 345/213 |

Primary Examiner—Wing F. Chan
Assistant Examiner—Vivian W. Chang
Attorney, Agent, or Firm—Ladas & Parry

[57] ABSTRACT

An on-screen display device which comprises: a microprocessor responsive to signals from a key pad and to a synchronizing signal in received video picture signals for providing digital display signals corresponding to the synchronizing signals and digital signals corresponding to the signals from the key pad; a digital-to-analog converter for converting the digital signals into analog voltage signals, and for generating an oscillating frequency signal in response to the digital display signals to adjust the position and size of characters displayed on the screen; and an on-screen display circuit for receiving the synchronizing signals and for receiving the digital signals from the microprocessor and the oscillation frequency signal from the digital-to-analog converter and generating signals for controlling a display of the synchronizing frequencies and picture control on the screen as on-screen display characters.

2 Claims, 4 Drawing Sheets

FIG. 4

|     | 7 | 6 | 5 | 4 | 3 | 2 | 1 | 0 |
|-----|---|---|---|---|---|---|---|---|
| R70 | Y | RGB | BL | VD | HD | BL | LS | NI |
| R71 |   | DISPLAY2 ON/OFF | SIZE-2 | SIZE-1 |   | DISPLAY1 ON/OFF | SIZE-2 | SIZE-1 |
| R72 |   | DISPLAY4 ON/OFF | SIZE-2 | SIZE-1 |   | DISPLAY3 ON/OFF | SIZE-2 | SIZE-1 |
| R73 |   | DISPLAY6 ON/OFF | SIZE-2 | SIZE-1 |   | PISPLAY5 ON/OFF | SIZE-2 | SIZE-1 |
| R74 | H-POSI 7 | H-POSI 6 | H-POSI 5 | H-POSI 4 | H-POSI 3 | H-POSI 2 | H-POSI 1 | H-POSI 0 |
| R75 | V-POSI 7 | V-POSI 6 | V-POSI 5 | V-POSI 4 | V-POSI 3 | V-POSI 2 | V-POSI 1 | V-POSI 0 |
| R76 | ROM ADDR 7 | ROM ADDR 6 | ROM ADDR 5 | ROM ADDR 4 | ROM ADDR 3 | ROM ADDR 2 | ROM ADDR 1 | ROM ADDR 0 |
| R77 | ROM CHAR 7 | ROM CHAR 6 | ROM CHAR 5 | ROM CHAR 4 | ROM CHAR 3 | ROM CHAR 2 | ROM CHAR 1 | ROM CHAR 0 |

ON-SCREEN DISPLAY DEVICE FOR A MULTIMODE MONITOR AND METHOD THEREOF

This is a continuation of application Ser. No. 07/990,413, filed on Dec. 15, 1992, now abandoned.

BACKGROUND OF THE INVENTION

1. Field of the Invention

The invention relates to a multimode monitor and, more particularly, to an on-screen display device for a multimode monitor that can display frequency and picture control modes on the screen of the multimode monitor in an on-screen display manner, and a method thereof.

2. Description of Related Art

On the one hand, a conventional multimode monitor that indicates a picture control mode that can be changed by a user with a key input of the multimode monitor uses light emitting diodes (LEDs) to display a presently selected picture control mode to the user. The LED display greatly increases the display area required by the multimode monitor, however, and the LEDs indicate only the selected picture control mode and not a fine control, frequency mode, which it also would be desirable to check.

On the other hand, Japanese laid-open patent publication No. sho 63-129788 describes a character generator controlled by a microprocessor and a red, green and blue (RGB) color encoder for superimposing an output signal of the character generator onto a composite video signal to achieve on-screen display of the generated characters on the screen of a television or monitor having a speed multiplication function. A speed multiplying circuit to transform the output signal of the character generator into a signal for speed-multiplied scanning onto the screen is not employed, however, whereby the cost of the product can be reduced desirably.

SUMMARY OF THE INVENTION

An object of the invention is to provide an on-screen display device for a multimode monitor that can display a frequency mode of the multimode monitor decided by a microprocessor and a picture control mode, including the state thereof, selected by a user key input in an on-screen display manner, i.e. with picture, whereby the display requires an extremely reduced area on the multimode monitor.

Another object of the invention is to provide a method for achieving on-screen display on a multimode monitor screen of a frequency mode for accuracy and a picture control mode including a state or level of resolution presently being viewed by a user for easy control of the multimode monitor.

To achieve the above objects according to the invention, there is provided an on-screen display device for a multimode monitor.

In one embodiment, a microprocessor decides on a frequency display mode of the multimode monitor on the basis of polarities of horizontal and vertical synchronizing signals and controls the entire device. A key input has a control function selection key or keys for selecting a picture control mode, such as brightness, for example, and a level-adjusting key or keys for finely controlling the state or level of the selected picture control mode. A digital-to-analog (D/A) converter is connected to the microprocessor for selecting output ports of the microprocessor corresponding to the selected picture control mode and converting picture control mode signals received therefrom into analog signals. A known on-screen display integrated circuit (OSD IC) is connected to the microprocessor for receiving serial data from the microprocessor, the D/A converter for receiving an oscillation frequency from the D/A converter and, through a mixer, to a display screen for displaying frequency and picture control modes on the screen in the form of on-screen display characters. The mixer is also connected to RGB signal lines of a video card for mixing RGB signals from the OSD IC and the video card, whereby the display characters appear on the screen with, for example, pictures from the video card.

According to another aspect of the invention, there is provided an on-screen display method for a multimode monitor that initializes a register for setting a serial clock, serial data and period line provided from the microprocessor to an OSC IC at high level state. The microprocessor also indicates the conditions of output polarity of video signals (synchronizing input polarity). Another register controls character size to be displayed in what line. Another register assigns the position of the characters on the screen.

According to the present invention, the OSD IC is employed instead of the display device having LEDs to indicate the picture control mode selected by a user. As a result, an area occupied by the display device is reduced remarkably, because frequency and picture control mode data are displayed on the monitor in a form of on-screen display characters.

BRIEF DESCRIPTION OF THE DRAWING

The above and other objects, features and advantages will be more apparent from the following description taken in conjunction to the accompanying drawings of a preferred embodiment, which illustrates but does not limit the invention, wherein:

FIG. 4 is a state table showing operation of registers of the method; and,

DESCRIPTION OF THE PREFERRED EMBODIMENT

Figure 1:
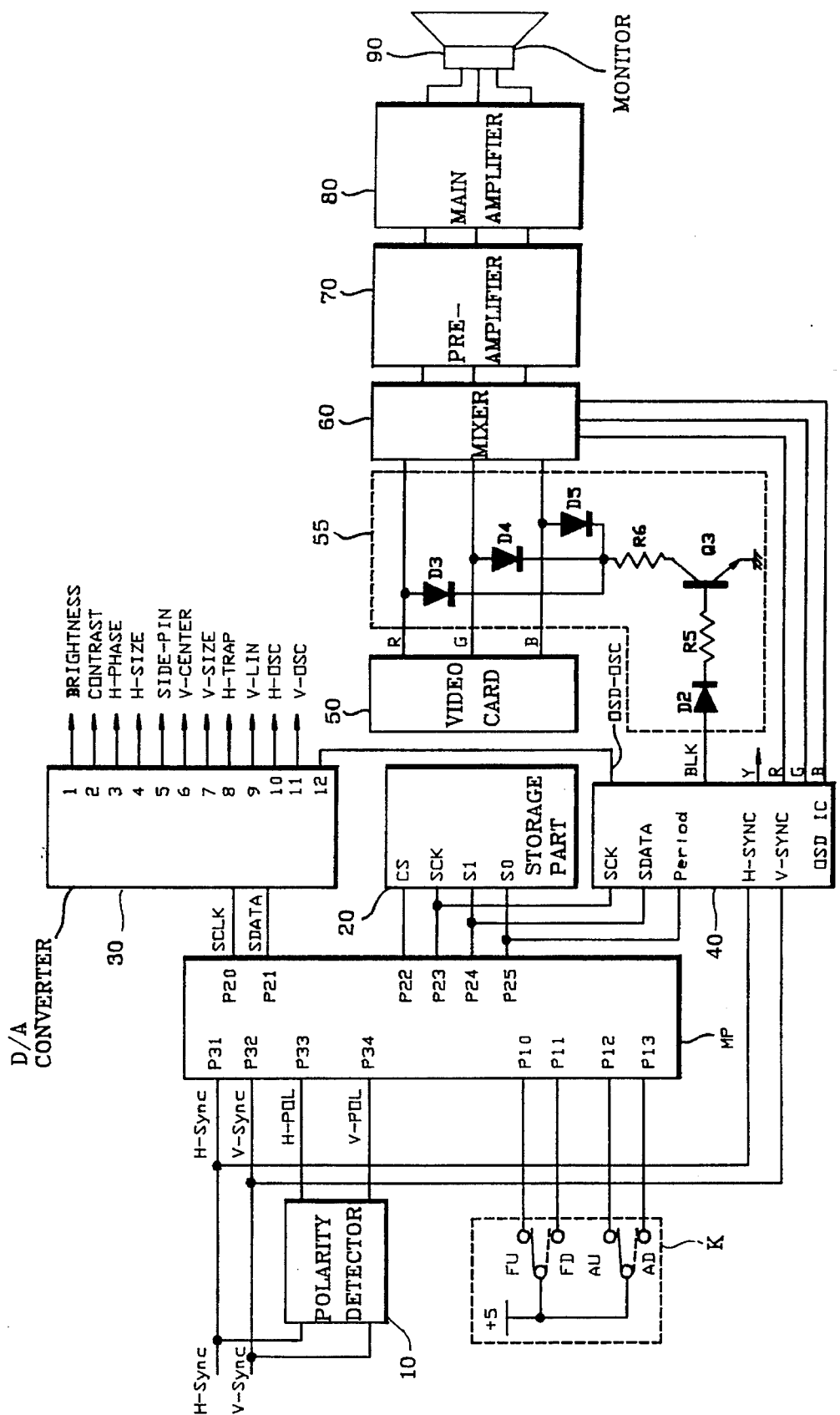
FIG. 1 is a mostly block schematic diagram of the embodiment.

In FIG. 1, a polarity detector 10 detects the polarities of horizontal synchronizing (H-sync) and vertical synchronizing (V-sync) video signals. The polarity detector provides signals respectively representing the detected polarities of the horizontal and vertical synchronizing signals over corresponding lines H-POL and V-POL to input ports P33 and P34 of a microprocessor MP.

A key input device K functions to select picture control modes such as brightness, contrast, horizontal size and the like of the video-signal picture to be displayed on a monitor 90 and to control the selected picture condition. For this, the key input device has user-operated function up and down key or keys FU and FD, which are shown as a single-pole, double-throw switch. These respectively cause the microprocessor to shift upwardly and downwardly successively through a preset roster of the picture control modes from one thereof selected by the microprocessor until deactivated (e.g. opened) to select one thereof. Similar level up and down keys AU and AD then cause the microprocessor to adjust the one selected picture control mode incrementally up or down in a direction selected by user operating of the level keys and increments selected by the microprocessor.

The microprocessor MP is composed of a single chip, for example an 8052 IC available from the Intel Co., Ltd. of California. It has ports as already described. In addition, input ports P10, P11, P12 and P13 are connected to the function and level up and down keys FU and FD and AU and AD for the operations already described. Further input ports P31 and P32 respectively receive the horizontal and vertical synchronizing signals H-sync and V-sync already described.

A storage part or device 20 is preferably composed of an electrically erasable programmable ROM (EEPROM) and stores data for the picture control modes under the control of the microprocessor MP.

A digital-to-analog (D/A) converter 30 has input terminals respectively connected to output ports P20 and P21 (i.e., SCLK and SDATA) of the microprocessor. The D/A converter converts clock data SCLK and digital picture control data SDATA from the microprocessor into analog signals. The clock-data analog signal OSD-OSC is at output terminal 12. The D/A converter also has a plurality of output terminals 1 to 11 through which various picture control mode analog signals, as rostered in FIG. 1, are output to a video card 50. The separate connections of the output terminals to the video card are not shown for simplicity and the video card, which has circuitry for producing a color video picture on the screen of the monitor 90 from a video signal input (not shown), is not described further, because known.

The OSD IC 40 has an input port that receives the oscillation-frequency signal OSD-OSC from the output terminal 12 of the D/A converter 30. The OSD IC 40 also has other input ports respectively connected to output ports P23, P24 and P25 of the microprocessor MP to receive output data (described below) from the ports P23, P24 and P25 in serial. The OSD IC 40 also receives the horizontal and vertical synchronizing signals H-sync and V-sync. Accordingly, the OSD IC 40 displays the present mode frequency and picture control mode on the monitor in an on-screen display manner on the basis of all of the signals and data supplied thereto.

A mixer 60 is connected to signal lines R, G and B respectively for red, green and blue video picture signals from the video card 50 and signal lines R', G' and B' respectively for red, green and blue video character signals from the OSD IC 40 for respectively mixing these signals. The mixer 60 has respectively corresponding output terminals that are connected through a pre-amplifier 70 and a main amplifier 80 to the monitor 90 for supplying the red, green and blue video picture and character signals thereto mixed and amplified.

In order to provide a blank space in the video picture on the monitor from the video picture signals of the video card for the characters from the video character signals of the OSD IC, the signal lines R, G and B from the video card 50 are coupled to a blanking signal line BLK from the OSD IC through a transistor Q3 of a blanking circuit 55. The transistor Q3 has a base connected with the blanking signal line BLK of the OSD IC 40 through a resistor R5, which serves to limit the base current, and a diode D2, which serves to prevent reverse current and, thus, protect the OSD IC 40 from any external damage. The transistor Q3 also has an emitter connected to a ground potential and a collector connected to the signal lines R, G and B of the video card 50 through a collector current limiting register R6 and respective diodes D3, D4 and D5, which serve to protect the video picture signals.

Figure 2:
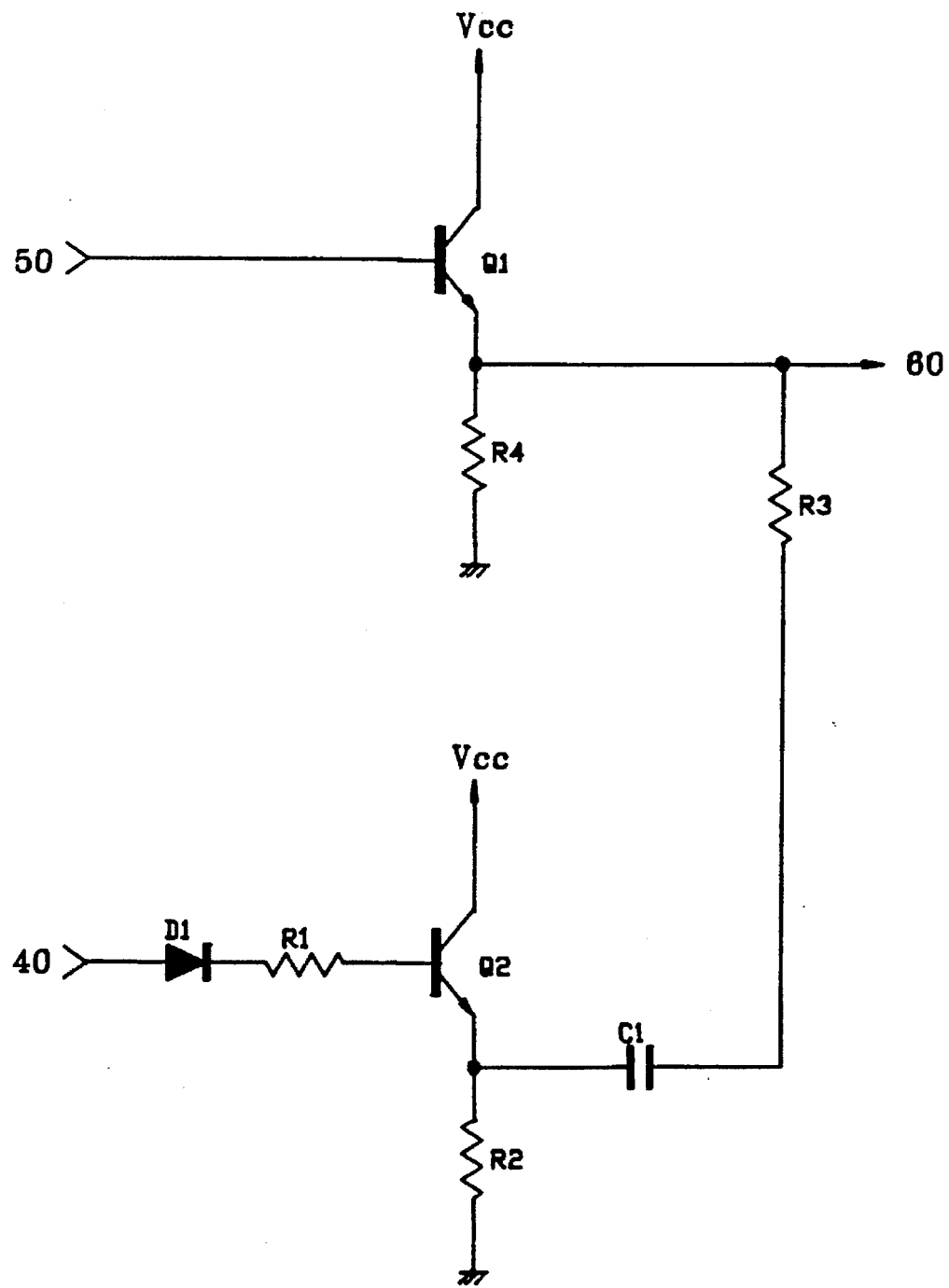
FIG. 2 is a more detailed circuit diagram of a portion of a mixer portion of the embodiment shown in FIG. 1.

FIG. 2 shows a detailed diagram of one of three identical circuits that make up the mixer 60. Each of the circuits has a first transistor Q1 having an emitter connected to a respective one of the signal lines R, G and B (indicated generically as 50 in FIG. 2) of the video card 50 and a second transistor Q2 having a base connected through a diode D1 and resistor R1 to a correspondingly respective one of the signal lines R', G' and B' (indicated generically as 40 in FIG. 2) of the OSD IC 40. As in the blanking circuit 55, diode D1 functions to prevent a reverse current into the OSD IC and the resistor R1 functions to limit the base current into the transistor Q2. Resistors R2 and R4 respectively connect the emitters of the transistors Q1 and Q2 to grounds and serve to limit the respective emitter currents. In addition, a capacitor C1, which serves as a DC coupling element, is connected between the emitter of the transistor Q2 and one end of a resistor R3. The opposite end of the resistor R3 is connected to the emitter of transistor Q1, whereby the emitters are commonly connected in such a way that the one of the red, green and blue signals of the video card 50 and OSD IC are mixed. Accordingly, the opposite end of resistor R3 is also connected to the pre-amplifier 70 and the resistor R3 serves as a video signal band width controlling element.

Figure 3:
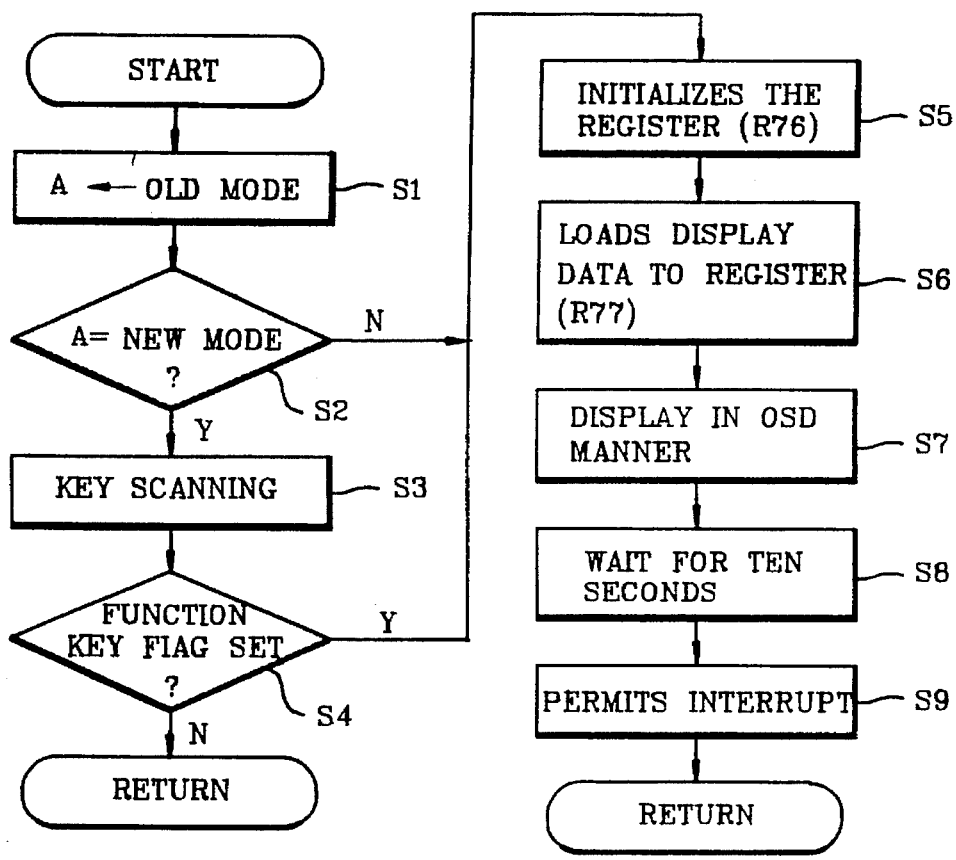
FIG. 3 is a flow chart illustrating an on-screen displaying method according to the present invention.

Now, the operation of the invention under the control of the microprocessor MP and storage device 20 will be described with reference to FIGS. 3 to 5. At a step S1 in FIG. 3, the preceding mode detected by the microprocessor MP is loaded into a first general purpose register A associated with the microprocessor and, at a step S2, the microprocessor causes the preceding mode to be compared with the presently detected mode to decide if the modes are equal to each other.

If at step S2 the modes are equal, the microprocessor advances to a step S3 at which the inputs of the function keys FU, FD to ports P10, P11 are scanned to detect if either key is providing an input signal from the key input part K. Upon detection of a key input signal, the microprocessor control advances to step S4, which determines whether a function key flag, i.e. function keys FU, FD and level keys AU, AD, is set or not.

If at step S2 the preceding mode is not equal to the new mode, or when a function key flag is set in step S4, the microprocessor initializes its register R76 in step S5 to designate positions of new character data to be displayed on the monitor in an on-screen display manner.

After the initialization of the register R76, the data to be displayed is loaded into a register R77 at step S6. This is character data from a ROM (read only memory) corresponding the new data. Consequently, at a step S7, the data representing the changed mode frequency, picture screen control mode and picture control state is displayed on the monitor in an on-screen display technique by the OSD IC 40 of FIG. 1. This display condition is retained for a time of predetermined duration in step S8, and after completion of the display duration, an interrupt may be available under a control of the microprocessor MP at a step S9.

FIG. 4 illustrates the registers described above, each of which is a known eight-bit register. In the register R70, bit "0" denotes a non-interlaced state, bit "1" denotes a smoothing process state for characters displayed, bit "2" a blanking signal state, bits "3" and "4", the polarities of the horizontal and vertical synchronizing signals, and bits "5", "6" and "7", output polarities of the video signal. Registers R71 to R73 each control the size of two lines of the characters that are displayed over six lines by the on-screen display process of the OSD IC 40 of FIG. 1. The sizes of the characters to be displayed on each of the six lines can be adjusted to a size-2 or size-1. Resisters R74 and R75 serve to designate a position of the picture screen in accordance with the horizontal and vertical synchronizing signals. Register R76 designates a position of the characters to be displayed in a range of 32 characters for each of the 6 lines, and register R77 designates the specific character data from the ROM.

Figure 5:
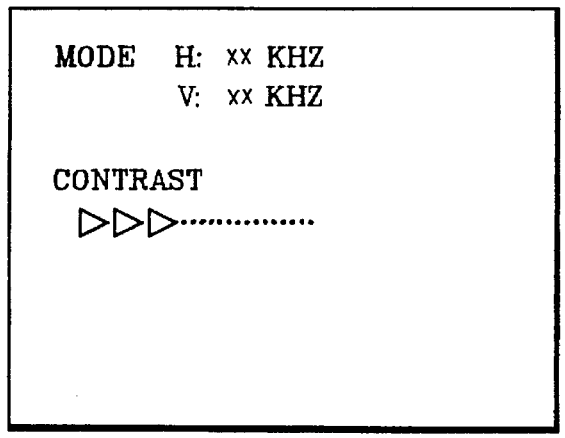
FIG. 5 is an elevation showing an example characters and blanked background displayed on a portion of a screen of a monitor of FIG. 1 in an on-screen display mode according to the present invention.

FIG. 5 shows an example of the monitor display state achieved according to the invention. The horizontal and vertical synchronizing signals according to the display mode are displayed on first and second lines, while the picture control mode and the picture control range according to the key input part K are properly displayed on third and fourth lines.

The microprocessor MP receives the frequencies of the horizontal synchronizing signal H-sync and the vertical synchronizing signal V-sync through the ports P31 and P32, and detects the polarities of the synchronizing signals H-sync and V-sync to decide the monitor mode. Consequently, the microprocessor MP supplies the data related to the desired monitor mode to the D/A converter 30 through its ports P20 and P21 and, thereby, to the video card 50.

Meanwhile, the microprocessor MP also selects the picture control mode if flagged in accordance with the function up or down keys FU or FD in the key input part K. If flagged, the microprocessor MP controls the increase or decrease in the level of the picture control mode in accordance with the level up or down keys AU or AD to assure, via the D/A converter 30 and video card 50 a fine control in the picture control mode selected. Simultaneously, the microprocessor MP stores the picture control mode and level data selected by the function up or down key FU or FD and the level up or down key AU or AD into the storage part 20.

The OSD IC 40 receives serial data supplied from the microprocessor MP and displays characters indicating the frequency corresponding to the video mode, picture control mode and the picture control mode range control on the monitor 90 in an on-screen display manner. The characters should be displayed on the monitor 90 in conformity with the horizontal and vertical frequencies, but in the multimode monitor, the horizontal and vertical frequencies vary with the video mode. As a result, the display timing changes, with a result that some of the characters displayed on the monitor are scarcely visible. Further, as the horizontal frequency increases, the characters are undesirably increased in width and the size of the characters formed by the hardware structure of the OSD IC 40 is also changed.

To prevent this, the microprocessor MP counts the frequencies of the horizontal and vertical synchronizing signals H-sync and V-sync and outputs the counted result to the D/A converter 30 which, in turn, linearly controls the output voltage of its oscillation-frequency signal OSD-OSC in accordance with the synchronizing frequencies H-sync and V-sync signals. This automatically compensates the size of the characters that otherwise would change with the synchronizing frequencies of the video mode. The oscillation-frequency signal OSD-OSC to the OSD IC 40 controls a dot clock signal that allows the characters from the OSD IC to be properly displayed on the monitor 90.

After the mixer 60 mixes the red, green and blue character signals from the OSD IC 40 with those from the video card 50 for the pre-amplifier 70 and main amplifier 80, which amplify the signals, and the monitor, which displays them, it can become difficult to separate the characters visually from the video signals. For this reason, the blanking signal output BLK of the OSD IC 40 is preferably connected to the red, green and blue signal lines R, G and B of the video card 50. As a result, when the characters are displayed on the monitor 90, the video signal produced at the video card 50 is muted on the monitor 90 at the display of the characters so that background of the character is colored in black and the characters are clearly displayed on the monitor 90.

That is, at the video signal position of fonts of the characters to be displayed, the blank signal output BLK of the OSD IC 40 produces a high level signal which, in turn, is supplied to the base of transistor Q3, which is of an N-channel type. Accordingly, the transistor Q3 is turned ON for the duration of the high level signal and the collector of the transistor Q3 is thus set to a low level potential, whereby the red, green and blue video signals of the video card 50 are muted and the black-colored background is displayed on the monitor 90. Meanwhile, farther along the signal paths toward the monitor 90, at the emitter side of the transistors Q1 and Q2, which also serve as buffering elements for a wave-shaping operation, the output video signals of the video card 50 are mixed with the output character signals of the OSD IC 40. As a result, the OSD characters can be displayed above the black-colored background of the monitor.

The OSD IC 40 produces combinations of red, green and blue character signals that can produce eight kinds of colors of the characters on the monitor 90. Further, a luminance-signal line Y of the OSD IC 40, which is connected (not shown) to the monitor, may be employed to produce 16 colors, as needed. For this, the OSD IC 40 has to be set manually on initial conditions that execute the desired on-screen display color function.

The OSD IC 40 also sets the serial clock SCLK, serial data SDATA and period signal "period" supplied through the ports P23, P24 and P25 of the microprocessor MP at a high level so as to initialize all of the control registers described above.

After the initialization of the OSD IC 40 and registers has been completed, the OSD IC 40 takes the video mode decided by the microprocessor MP and the picture control mode address produced by the D/A converter 30 to display the picture control mode and the like on the screen of the monitor. The address represents the picture control mode and picture control range which are changed in accordance with the keys of key part K. If the picture control mode is flagged for, the horizontal and vertical synchronizing frequencies are input from a horizontal and vertical synchronizing counter register (not shown) to the OSD IC 40. Accordingly, the OSD IC 40 displays data corresponding the synchronizing frequencies on a first and second lines of the on-screen display on the monitor and further displays the picture control mode selected by the function keys FU and FD and the picture control range set by the level keys AU and AD on the third and fourth lines of the monitor 90, as shown in FIG. 5.

It will be apparent that, in the key input part K, the illustrated push-button type level control keys AU, AD at least could be replaced by round-type, rotary switches so as to minimize a space occupied by the key input part K.

Since, as described above according to the invention, the frequency in the video display mode decided on the basis of the frequency and polarity of the horizontal and vertical synchronizing signals is displayed together with the picture control mode selected by using the function keys and the picture control range varied by using the level keys, there is improved control of the resolution of the picture on the monitor screen. In addition, the space occupied by the display part is reduced considerably.

Variations and improvements of the invention thus described as would occur from the description are also contemplated as within the scope of the invention, which is defined by the following claims.

What is claimed is:

1. An on-screen display device for controlling a dot clock and for a multimode monitor having a screen and responsive to a change of frequencies or polarities of synchronizing signals in received video picture signals and adapted for displaying the video picture signals and characters corresponding to signals representing said frequencies and corresponding to input picture control signals generated by an associated key pad, said device comprising:

- a microprocessor responsive to the signals from the key pad and to said synchronizing signals for providing digital display signals corresponding to said synchronizing signals and digital signals corresponding to the picture control signals;

- a digital-to-analog converter for converting the digital signals for picture control provided by said microprocessor into analog voltage signals, and generating an oscillating frequency signal in response to said digital display signals for controlling said dot clock so as to adjust the position and size of characters displayed on said screen;

- an on-screen display means for receiving said synchronizing signals and for receiving said digital signals from the microprocessor and said oscillation frequency signal from said digital-to-analog converter and generating signals for controlling the display of the synchronizing frequencies and the picture control on the screen as on-screen display characters;

- a blanking means for producing a blanking signal for blanking the display of the video picture signals on a portion of the screen corresponding to the position of the characters;

- mixing means for mixing the video picture signals and character signals supplied from said on-screen display means, said mixing means including pairs of emitter coupled transistors respectively receiving the video picture and characters and applying the same to the monitor; and

- a polarity detector for detecting the polarities of horizontal and vertical synchronizing signals of the video picture signals, said detector being coupled to said microprocessor and supplying polarity signals to said microprocessor for activating registers therein.

2. Said on-screen display device for said multimode monitor of claim 1 further comprising memory means for storing the input picture control signals provided from said key pad, said microprocessor providing a serial clock, serial data, and a period signal to said on-screen display means.

\* \* \* \* \*